(12) United States Patent
Youmans et al.

(10) Patent No.: US 6,247,719 B1
(45) Date of Patent: Jun. 19, 2001

(54) WATERCRAFT TRAILER INCORPORATING SLIDABLE BUNK ELEMENTS

(75) Inventors: Gary L. Youmans; Tony P. Priesgen, both of Hartford, WI (US)

(73) Assignee: Triton Corporation, Hartford, WI (US)

( * ) Notice: Subject to any disclaimer, the term of this patent is extended or adjusted under 35 U.S.C. 154(b) by 0 days.

(21) Appl. No.: 09/387,128

(22) Filed: Aug. 31, 1999

(51) Int. Cl.[7] .................................................. B60P 3/10
(52) U.S. Cl. .................................. 280/414.1; 280/414.2; 280/414.3; 280/638; 280/656
(58) Field of Search .......................... 280/414.1, 414.2, 280/414.3, 638, 656

(56) References Cited

U.S. PATENT DOCUMENTS

| | | | |
|---|---|---|---|
| 4,623,161 | * | 11/1986 | Sprague .............................. 280/414.1 |
| 4,664,401 | * | 5/1987 | Carrick ............................... 280/414.1 |
| 4,717,165 | * | 1/1988 | Johnson .............................. 280/414.1 |
| 4,802,685 | * | 2/1989 | Godbersen ......................... 280/414.1 |
| 4,986,571 | * | 1/1991 | Godbersen ......................... 280/414.1 |
| 5,133,570 | * | 7/1992 | Godbersen ......................... 280/414.1 |
| 5,292,145 | * | 3/1994 | Ostrand .............................. 280/414.1 |
| 5,518,261 | * | 5/1996 | Godbersen ......................... 280/414.1 |
| 5,823,559 | | 10/1998 | Priesgen et al. ................... 280/414.1 |
| 5,961,139 | * | 10/1999 | Nichols, II ......................... 280/414.1 |

* cited by examiner

*Primary Examiner*—Brian L. Johnson
*Assistant Examiner*—Deanna Draper
(74) *Attorney, Agent, or Firm*—Boyle Fridrickson Newholm Stein & Gratz S.C.

(57) ABSTRACT

A trailer is provided for accommodating various sized watercraft thereon. The trailer includes a frame structure extending along the longitudinal axis and a wheel and axle assembly for supporting the frame structure above a supporting surface. First and second bunk elements are supported by the frame structure. The first bunk element is movable along an axis transverse to the longitudinal axis to vary the distance between the bunk elements and is also movable along an axis parallel to the longitudinal axis of the frame structure between a forward position and a rearward position.

8 Claims, 2 Drawing Sheets

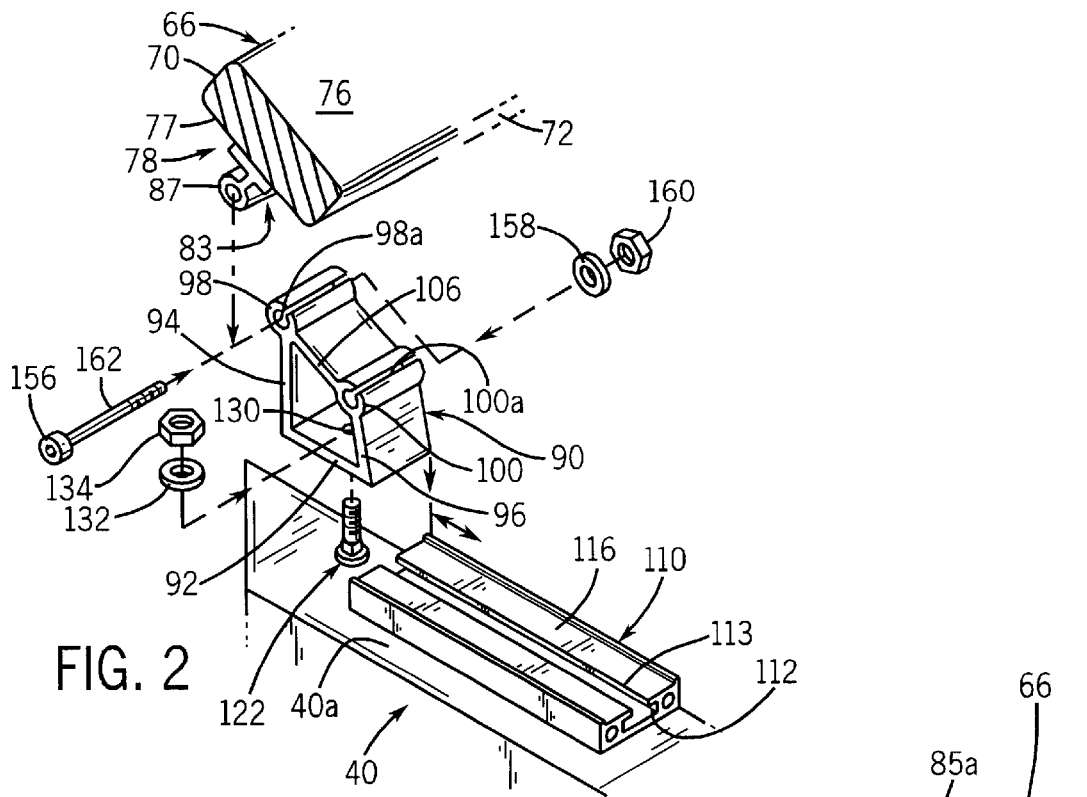
FIG. 2
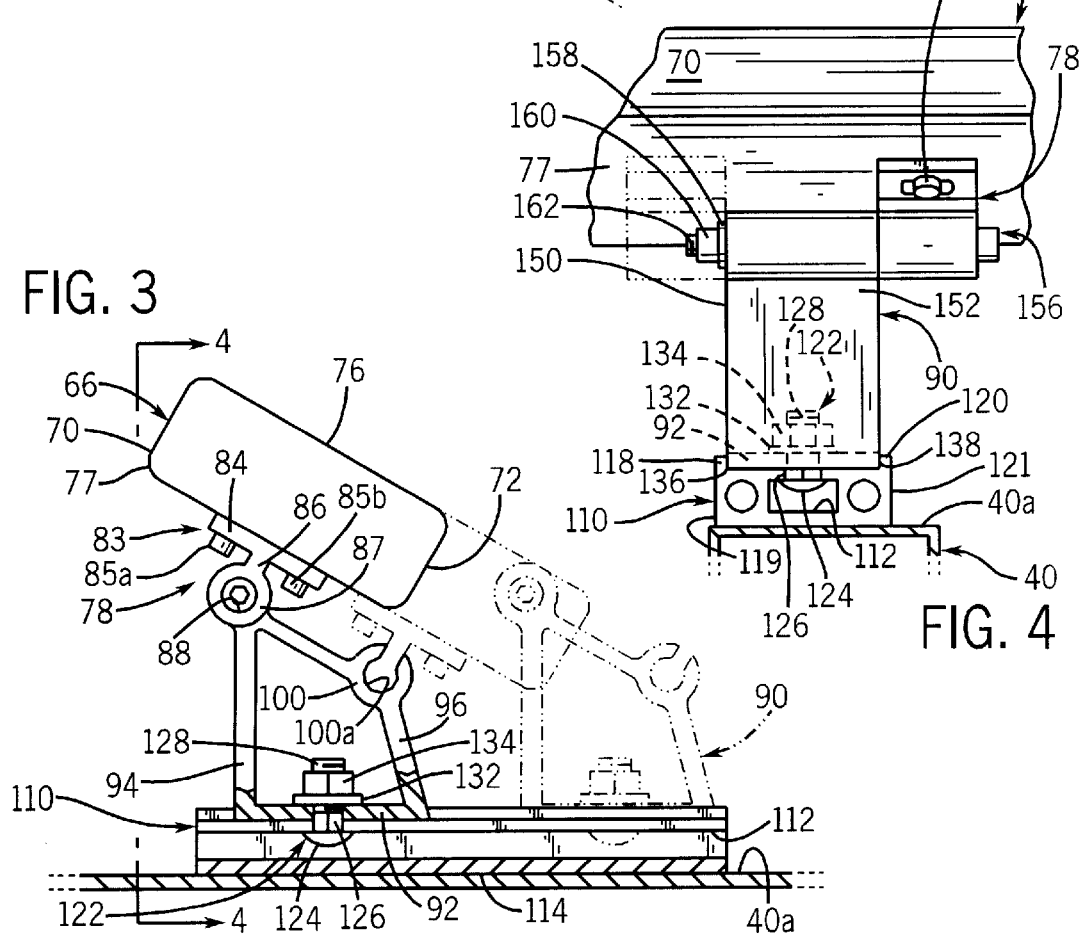
FIG. 3
FIG. 4

WATERCRAFT TRAILER INCORPORATING SLIDABLE BUNK ELEMENTS

FIELD OF THE INVENTION

This invention relates to trailers, and in particular, to a trailer for accommodating various sized watercraft thereon.

BACKGROUND OF THE PRESENT INVENTION

Typically, watercraft trailers are used to transport predetermined types of watercraft over a distance. However, in recent years, boat manufactures have introduced a plurality of new watercraft in order to attract new customers. These types of watercraft come in a variety of styles and sizes to satisfy the needs of those potential customers. With the increase in the number of styles and sizes of watercraft available, a corresponding need has arisen to provide a watercraft trailer which is more adaptable and which can accommodate many of the various styles and sizes of new watercraft.

Heretofore, most watercraft trailers which have been designed to accommodate various styles and sizes of watercraft have been unsatisfactory. Cumbersome and time consuming mechanisms are often used for repositioning elements of the watercraft trailer such as the bow stops and the bunk elements. In fact, in most watercraft trailers, the spacing between a pair of bunk elements on the watercraft trailer cannot be adjusted to accommodate the different bottoms associated with different types of watercraft, or if adjustable, only through a complicated and tedious process.

A trailer which overcomes most of the limitations in the art is disclosed in Priesgen et al., U.S. Pat. No. 5,823,559 which is assigned to the assignee of the present invention, Triton Corporation, and is incorporated herein by reference. The watercraft trailer disclosed in the '559 patent accommodates a plurality of various sized watercraft thereon. The watercraft trailer includes a bow stop assembly slidably mounted to the frame structure of the trailer. Pairs of bunk elements are also mounted to the frame structure. Each bunk element of a pair of bunk elements is slidable in unison with the other bunk element of the pair to adapt the watercraft trailer to various styles and sizes of watercraft.

While functional for its intended purpose, the watercraft trailer disclosed in the '559 patent has limitations. By way of example, the position of the bunk elements may not be adjusted along the longitudinal axis of the trailer. As a result, the watercraft trailer in the '559 patent is limited for use in connection with watercraft of predetermined lengths. Further, the spacing between each bunk element of a pair of bunk elements cannot be adjusted. This, in turn, limits the watercraft trailer disclosed in the '559 patent to use in connection with watercraft having bottoms of predetermined styles and/or widths. As such, the trailer disclosed in the '559 patent is restricted to use in connection with the specific types of watercraft for which it was designed.

Therefore, it is a primary object and feature of the present invention to provide a watercraft trailer which accommodates various styles and sizes of watercraft.

It is a further object and feature of the present invention to provide a watercraft trailer which includes bunk elements which are easily repositionable to accommodate watercraft of different styles and sizes.

It is a still further object and feature of the present invention to provide a watercraft trailer which is simple to utilize and inexpensive to manufacture.

SUMMARY OF THE PRESENT INVENTION

In accordance with the present invention, a trailer is provided. The trailer includes a frame structure extending along a longitudinal axis. The frame structure has first and second side portions and first and second cross frame members transverse to the longitudinal axis and interconnecting the side portions. A wheel and axle assembly extends along an axle axis transverse to the longitudinal axis to the frame structure. The wheel and axle assembly is mounted to the side portions of the frame structure for supporting the frame structure above a supporting surface. First and second bunk elements are supported by the frame structure. The first bunk element is movable along the axis transverse to the longitudinal axis in order to vary the distance between the bunk elements.

The trailer may include a mounting assembly for interconnecting the first bunk element to the frame structure at a user selected position thereon. The mounting assembly includes a guide track interconnected to the frame structure and a connection bracket having a first end interconnected to the bunk element and a second end slidable along the guide track. The connection structure further includes a fastening assembly. The fastening assembly retains the second end of the connection bracket at the user selected position along the guide track. The first end of the connection bracket includes first and second mounting structures extending therefrom. The first bunk element is selectively mounted to one of the mounting structures.

It is contemplated to provide a second connection bracket. The second connection bracket has a first end interconnected to the bunk element and a second end rigidly connected to the frame structure. It is further contemplated that the first bunk element may be movable along an axis parallel to the longitudinal axis of the frame structure between the first forward position and the second rearward position.

In accordance with a still further aspect of the present invention, a trailer is provided. The trailer includes a frame structure extending along a longitudinal axis. A wheel and axle assembly extends along an axle axis transverse to the longitudinal axis of the frame structure. The wheel and axle assembly supports the frame structure above a supporting surface. First and second bunk elements are supported on the frame structure. Each bunk element is generally parallel to the longitudinal axis of the frame structure and the first bunk element is slidable along a sliding axis perpendicular to the longitudinal axis of the frame structure. A mounting assembly is provided for interconnecting the first bunk element to the frame structure. A fastening element maintains the first bunk element at a user selected position along the sliding axis.

The frame structure may include first and second side portions and first and second cross frame members transverse to the longitudinal axis and interconnecting the side portions. The wheel and axle assembly is mounted to the side portions of the frame structure.

It is contemplated that the mounting assembly include a guide track mounted to one of the cross frame members and a connection bracket slidable within the guide track. The fastening element interconnects the connection bracket and the guide track to retain the first bunk element in the user selected position. The connection bracket includes first and second mounts extending therefrom. Each mount having a forward and a rearward edge. A connection element pivotably connects the first bunk element to a user selected mount of the connection bracket. The first bunk element is movable along an axis parallel to the longitudinal axis of the frame structure between a first forward position and a second rearward position. The first bunk element includes a mounting flange which abuts the forward edge of the user selected bunk with the first bunk element in the forward position and abuts the rearward edge of the user selected mount with the first bunk element in the rearward position.

In accordance with a still further aspect of the present invention, a trailer is provided. The trailer includes a frame structure extending along the longitudinal axis and a wheel and axle assembly extending along an axle assembly transverse to the longitudinal axis of the frame structure. The wheel and axle assembly supports the frame structure above a supporting surface. First and second bunk elements are supported on the frame structure. The first bunk element is movable along an axis parallel to the longitudinal axis of the frame structure between the first forward position and a second rearward position. A fastening element retains the first bunk element in the user selected position along the axis.

It is contemplated to provide a mounting assembly for interconnecting the first bunk element to the frame structure. The first bunk element is slidable along a sliding axis perpendicular to a longitudinal axis of the frame structure. The mounting assembly includes a guide track interconnected to the frame structure and a connection bracket having a first end interconnected to the first bunk element and a second end slidable along the guide track. A second connection bracket has a first end interconnected to the second bunk element and a second end rigidly connected to the frame structure. The second bunk element is movable along a second axis parallel to the longitudinal axis of the frame structure between the first forward position and a second rearward position. A second fastening element retains the second bunk element at a user selected position along the second axis.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 2 is an enlarged isometric view, partially in section, showing a mounting structure for mounting a bunk element to the frame of the trailer of the present invention;

FIG. 3 is a cross-sectional view taken along line 3—3 of FIG. 1; and

FIG. 4 is a cross-sectional view taken along line 4—4 of FIG. 3.

DETAILED DESCRIPTION OF THE PREFERRED EMBODIMENT

Figure 1:
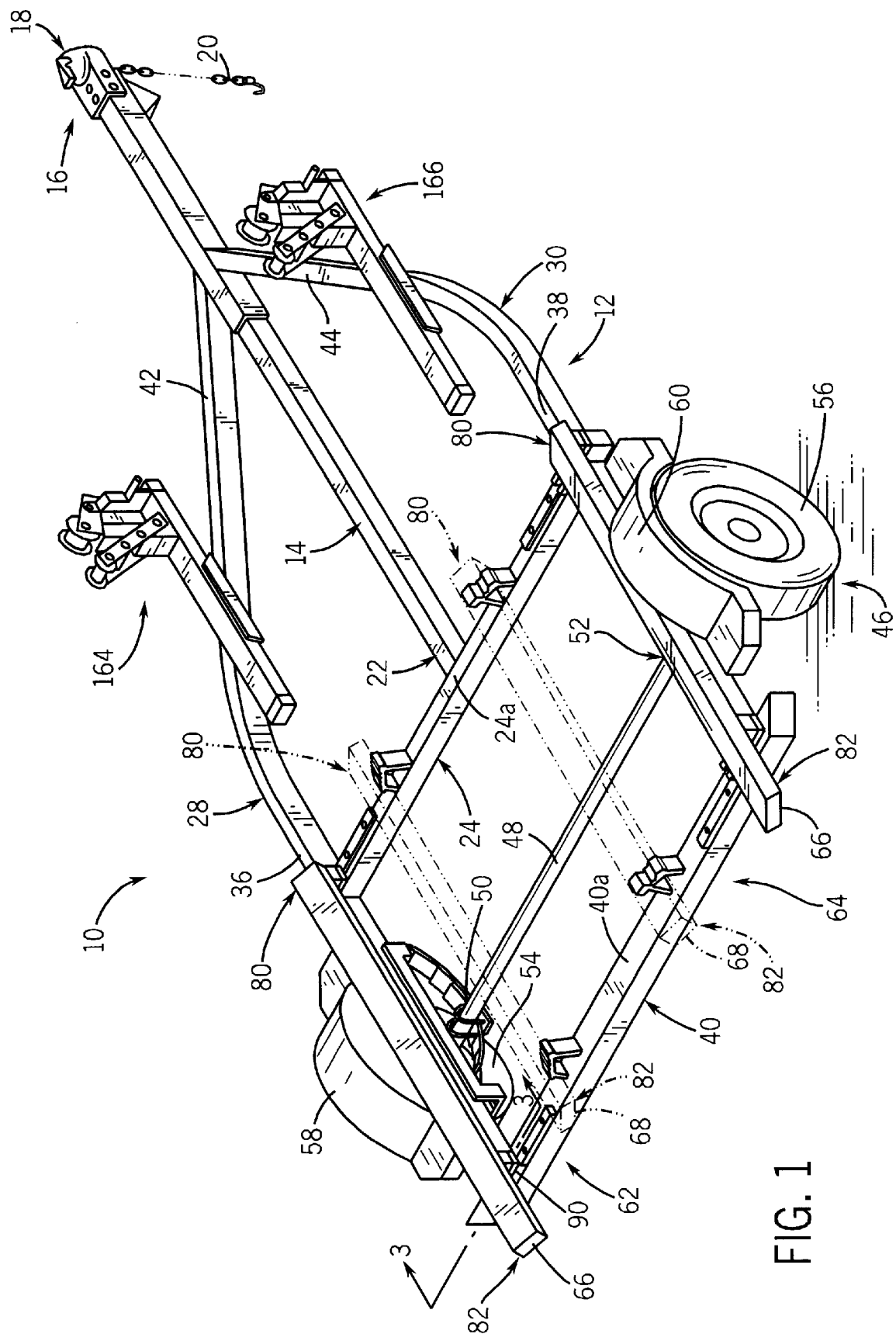
FIG. 1 is an isometric view of a watercraft trailer in accordance with the present invention.

Referring to FIG. 1, a trailer in accordance with the present invention is generally designated by the reference numeral 10. As shown in the drawings, trailer 10 is adapted for receiving a pair of personal watercraft (not shown) thereon. It is contemplated as being within the scope of the present invention to provide trailer 10 as a pontoon trailer, a boat trailer or the like.

Trailer 10 includes a frame structure 12 which extends along the longitudinal axis. Frame structure 12 includes an elongated central frame member 14 extending along the longitudinal axis of trailer 10. Central frame member 14 has a first end 16 having a cup-shaped receiver 18 mounted thereon for receiving a conventional ball attached to the rear of a towing vehicle. A chain 20 extends from forward end 16 of central frame member 14 in order to further secure trailer 10 to the towing vehicle.

Central frame member 14 includes a rearward end 22 which it is joined to a first cross frame member 24 transverse to the longitudinal axis of trailer 10. First and second side frame members 28 and 30, respectively, are joined to and extend from opposite sides of central member 14. Side frame members 28 and 30, respectively, include corresponding side portions 36 and 38, respectively, which are parallel to each other and to the longitudinal axis of trailer 10. Side portions 36 and 38 of side frame members 28 and 30, respectively, are interconnected by first cross frame member 24 and second cross frame member 40 which is parallel to and positioned rearwardly of first cross frame member 24. Side frame members 28 and 30 further include angled side portions 42 and 44, respectively, which extend between straight side portions 36 and 38, respectively, and central frame member 14.

Frame structure 12 of watercraft trailer 10 is supported above a supporting surface by a wheel and axle assembly 46. Wheel and axle assembly 46 includes an axle 48 having first and second opposite ends 50 and 52, respectively. Each end 50 and 52 of axle 48 is supported by corresponding straight side portions 36 and 38 of side frame members 28 and 30, respectively. Wheels 54 and 56 are rotatably mounted on ends 50 and 52, respectively, of axle 48. Fenders 58 and 60 partially surround wheels 54 and 56, respectively, and are mounted on corresponding straight side portions 36 and 38, respectively, of side frame members 28 and 30, respectively. First and second pairs of bunk assemblies 62 and 64, respectively, are mounted on cross frame members 24 and 40 as hereinafter described. Each pair of bunk assemblies 62 and 64 is identical and as such, the description of bunk assembly 62 is understood to describe bunk assembly 64 as if fully described herein.

Bunk assembly 62 includes first and second bunk elements 66 and 68, respectively, which are spaced from each other and adapted for engaging the bottom of a watercraft thereon. Each bunk element 66 and 68 extends along an axis generally parallel to the longitudinal axis of trailer 10. Referring to FIGS. 2–4, bunk elements 66 and 68 have a generally rectangular cross section and are defined by first and second sides 70 and 72, respectively, interconnected by upwardly directed watercraft engaging face 76 and downwardly directed face 77. First and second connection flanges 78 extend from downwardly directed faces 77 of bunk elements 66 and 68. As best seen in FIG. 1, first connected flanges 78 are positioned adjacent the forward ends 80, respectively, of bunk elements 66 and second connection flanges 78 are positioned adjacent rearward ends 82 of bunk elements 66 and 68 a predetermined distance apart. Each connection flange 78 includes a T-shaped base 83 having first leg 84 interconnected to corresponding bunk elements 64 and 68 by a pair of bolts 85a and 5b. Second leg 86 depends from first leg 84 and terminates at a connection tube 87 which defines passageway 88 therethrough.

Referring to FIG. 1, in order to interconnect bunk elements 66 and 68 to frame structure 12, connection brackets 90 are provided. Each bunk element 66 and 68 is interconnected to frame structure 12 by a pair of connection brackets 90, namely, a forwardly positioned connection bracket 90 mounted to cross frame member 24 and a rearwardly positioned connection bracket 90 mounted to cross frame member 40. Both connection brackets 90 of a pair of connection brackets interconnect a corresponding bunk element (bunk element 66 or bunk element 68) either rigidly to cross frame members 24 and 40 (e.g. bunk element 68) or slidably to cross frame members 24 and 40 (e.g. bunk element 66).

Referring to FIGS. 2–4, each connection bracket 90 includes a generally flat base 92 having first and second side walls 94 and 96, respectively, extending upwardly therefrom. First and second side walls 94 and 96, respectively, of connection bracket 90 terminate at corresponding connection tubes 98 and 100, respectively. Each connection tube 98 and 100 extends along a corresponding axis which is generally parallel to the longitudinal axis of the trailer 12. Slots 102 and 104 in connection tubes 98 and 100, respectively, of connection bracket 90 extend along the entire length thereof in order to facilitate the molding and/or manufacture of connection bracket 90. Connection tubes 98 and 100, respectively, of each connection bracket 90 are interconnected by an upper wall 106 which extends therebetween and at a predetermined angle to base 92 thereof. Upper wall 106 is provided at an angle in order to facilitate the mounting of bunk elements 66 and 68 at predetermined elevations with respect to support frame 12 of watercraft trailer 10 so as to allow outwardly directed watercraft engaging faces 76 of bunk elements 66 and 68 to engage various sized and/or shaped bottoms of watercraft postioned thereon.

Referring back to FIG. 1, bunk element 68 is mounted to frame structure 12 by a first connection bracket 90 rigidly secured to the upper surface 40a of rearwardly cross frame member 40 and a second connection brackets 90 rigidly secured to the upper surface 24a of forwardly cross frame member 24. Bunk element 66 is mounted to frame structure 12 by a first connection bracket 90 slidably mounted to the upper surface 40a of rearwardly cross frame member 40 and by a second connection bracket 90 slidably mounted to the upper surfaces 24a of forwardly cross frame member 24. Connection brackets 90 are orientated such that upper walls 106 of connection brackets 90 which support bunk element 66 diverge from upper walls 106 of connection brackets 90 which support bunk element 68.

Referring to FIGS. 2–4, in order to slidably mount connection bracket 90 on corresponding upper faces 24a and 40a of cross-frame members 24 and 40, respectively, mounting brackets, generally designated by the reference numeral 110, are provided. By way of example, mounting bracket 110 is affixed to the upper surface 40a of rearwardly cross frame member 40. Mounting bracket 110 extends along an axis perpendicular to the longitudinal axis of watercraft trailer 10 and includes a passageway 112 extending through the entire length thereof. Guide slot 113 extends from passageway 112 and terminates at upwardly directed surface 116 of mounting bracket 110.

As best seen in FIGS. 3–4, mounting bracket 110 has a generally rectangular cross section and includes a bottom surface 114 affixed to upper surface 40a of cross frame member 40 in any suitable manner such as by welding or the like. Mounting bracket 110 further includes first and second guide walls 118 and 120, respectively, extending from opposite sides 119 and 121, respectively, thereof. First and second guide walls 118 and 120, respectively, are separated by upper surface 116 of mounting bracket 110 such that first and second guide walls 118 and 120, respectively, define a channel for slidably receiving base 92 of connection bracket 90 therein.

In order to slidably interconnect connection bracket 90 and mounting bracket 110, carriage bolt 122 is positioned such that head 124 is received within passageway 112 in mounting bracket 110 and such that neck 126 of carriage bolt 112 is received within guide slot 113. Threaded shaft 128 of carriage bolt 122 extends through aperture 130 in base 92 of connection bracket 90 and a washer 132 and nut 134 combination is threaded thereon. Washer 132 and nut 134 combination maintain neck 126 of carriage bolt 122 within guide slot 113 in mounting bracket 110.

As described, connection bracket 90 is slidably positioned on upper surface 116 of mounting bracket 110 such that sides 136 and 138 of base 92 of connection bracket 90 are received between guide walls 118 and 120, respectively, of mounting bracket 110. Guide walls 118 and 120 prevent connection bracket 90 from rotating about threaded shaft 128 of carriage bolt 122 as connection bracket 90 is slid along upper surface 116 of mounting bracket 110. When connection bracket 90 has been positioned at an operator desired position along upper surface 116 of mounting bracket 110, nut 134 is tightened onto threaded shaft 128 of carriage bolt 122 thereby rigidly maintaining connection bracket 90 in the operator desired position along upper surface 116 of mounting bracket 110.

It can be readily appreciated that connection bracket 90 for supporting forward end 80 of bunk element 66 may be slidably mounted on a corresponding mounting bracket 110 affixed to the upper surface 24a of forwardly cross frame member 24 as heretofore described with respect to the mounting of connection bracket 90 on mounting bracket 10 affixed to the upper surface 40a of rearwardly cross frame 40.

In order to interconnect bunk elements 66 and 68 to corresponding connection brackets 90, bunk elements 66 and 68 are positioned on corresponding connection brackets 90 (mounted to frame structure 12 as heretofore described) such that passageways 88 through connection tubes 87 of connection flanges 78 are axially aligned with user selected passageways 98a or 100a in connection tubes 98 and 100, respectively, of connection brackets 90. As best seen in FIG. 3, each passageway 88 through connection tube 87 may be aligned with passageway 98a through corresponding connection tube 98 of connection bracket 90 or, as shown in phantom in FIG. 3, may be axially aligned with passageway 100a through corresponding connection tube 100 of connection bracket 90. Such an arrangement allows a user to reposition bunk elements 66 and 68 to accommodate water craft having bottoms of various shapes and sizes.

It is contemplated that the axial distance between connection flanges 78 adjacent the forward ends 80 of bunk elements 66 and 68 and the connection flanges 78 adjacent the rearward ends 82 of bunk elements 66 and 68 correspond to the distance between the forwardly directed edges 150 of connection brackets 90 mounted to cross frame member 24 and forwardly directed edges 150 of connection brackets 90 mounted to cross frame member 40.

In order for the bunk elements 66 and 68 to adequately support watercraft of various lengths, the position of bunk elements 66 and 68 may be adjusted along the length of the longitudinal axis of trailer 10. Referring to FIG. 4, each bunk element 66 and 68 is positionable in a forward position, shown in phantom in FIG. 4, wherein connection flanges 78 are forwardly of connection brackets 90 or in a rearward position wherein connection flanges 78 are rearwardly of rearward directed edges 152 of connection brackets 90. With bunk elements 66 and 68 in the desired forward or rearward position, bolts 156 are inserted through corresponding passageways 88 in connection tubes 87 of connection flanges 78 and through user selected passageways 98a or 100a through connection tubes 98 and 100, respectively, in a corresponding connection brackets 90. Washer 158 and nut 168 combinations are threaded onto the shafts 162 of bolts 156 thereby interconnecting connection bolts 78, and hence bunk elements 66 and 68, to corresponding connection brackets 90.

In view of the above description, it can be readily understood that the spacing between bunk element 66 and bunk element 68 of bunk assembly 62 may be altered by repositioning connection brackets 90 interconnected to bunk element 66 along corresponding upper surfaces 116 of mounting brackets 110. It is further contemplated that the connection brackets 90 interconnected to bunk element 68 may be slidably mounted on corresponding mounting brackets 110 mounted to upwardly facing surfaces 24a and 40a of cross frame members 24 and 40, respectively, such that both bunk elements 66 and 68 of bunk assembly 62 may be repositionable along an axis transverse to the longitudinal axis of trailer 10.

In order to prevent forward and rearward movement of watercraft supported on bunk elements 66 and 68 of bunk assemblies 62 and 64 during transport of trailer 10, first and second bow stop assemblies 162 and 164 are provided. The structure of first and second bow stop assemblies 162 and 164, respectively, are fully described in Priesgen et al , U.S. Pat. 5,823,559 which has been incorporated herein by reference.

Various modes of carrying out the invention are contemplated as being within the scope of the following claims particularly pointing out and distinctly claiming the subject matter which is regarded as the invention.

I claim:

1. A trailer, comprising:
   a frame structure extending along a longitudinal axis, the frame structure including first and second side portions, and first and second cross frame members transverse to the longitudinal axis and interconnecting the side portions;
   a wheel and axle assembly extending along an axle axis transverse to the longitudinal axis of the frame structure and mounted to the side portions of the frame structure for supporting the frame structure above a supporting surface; and
   first and second bunk elements supported by the frame structure, the first bunk element movable along an axis transverse to the longitudinal axis to vary the distance between the bunk elements;
   a mounting assembly for interconnecting the first bunk element to the frame structure at a user selected position thereon, the mounting assembly includes a guide track interconnected to the frame structure perpendicular to the longitudinal axis thereof and a connection bracket having a first end interconnected to the first bunk element and a second end slidable along the guide track, wherein the first end of the connection bracket includes first and second mounting structures extending therefrom, the first bunk element selectively mounted to one of the mounting structures.

2. The trailer of claim 1 wherein the connection bracket further includes a fastening assembly, the fastening assembly retaining the second end of the connection bracket at the user selected position along the guide track.

3. The trailer of claim 2 further comprising a second connection bracket, the second connection bracket having a first end interconnected to the second bunk element and a second end rigidly connected to the frame structure.

4. The trailer of claim 1 wherein the first bunk element is movable along an axis parallel to the longitudinal axis of the frame structure between a first forward position and a second rearward position.

5. A trailer, comprising:
   a frame structure extending along a longitudinal axis, the frame structure includes first and second side portions, and first and second cross frame members transverse to the longitudinal axis and interconnecting the side portions;
   a wheel and axle assembly extending along an axle axis transverse to the longitudinal axis of the frame structure for supporting the frame structure above a supporting surface, the wheel and axle assembly being mounted to the side portions of the frame structure;
   first and second bunk elements supported on the frame structure, each bunk element being generally parallel to the longitudinal axis of the frame structure and the bunk element being slidable along a sliding axis perpendicular to the longitudinal axis of the frame;
   a mounting assembly for interconnecting the first bunk element to the frame structure, the mounting assembly includes a guide track mounted to one of the cross frame members and a connection bracket slidable within the guide track and including first and second mounts extending therefrom, each mount having a forward and a rearward edge.
   a fastening element for interconnecting the connection bracket and the guide track to retain the first bunk element in the user selected position.

6. The trailer of claim 5 further comprising a connection element for pivotably connecting the first bunk element to a user selected mount of the connection bracket.

7. The trailer of claim 6 wherein the first bunk element is movable along an axis parallel to the longitudinal axis of the frame structure between a first forward position and a second rearward position.

8. The trailer of claim 7 wherein the first bunk element includes a mounting flange, the mounting flange abutting the forward edge of the user selected mount with the first bunk element in the forward position and abutting the rearward edge of the user selected mount with the first bunk element in the rearward position.

* * * * *